Patented June 20, 1939

2,163,109

UNITED STATES PATENT OFFICE

2,163,109

CHEMICAL PROCESS AND PRODUCTS THEREFROM

Edgar W. Spanagel, Wilmington, Del., assignor to E. I. du Pont de Nemours & Company, Wilmington, Del., a corporation of Delaware No Drawing. Application April 3, 1936, Serial No. 72,668

29 Claims. (Cl. 260—338)

The invention herein described relates to new compositions of matter, more particularly to self esters of hydroxyether acids, and still more particularly to large ring cyclic esters of the ether lactone type.

This case is a continuation in part of application Serial No. 10,637, filed March 12, 1935.

Ether lactones having more than seven members or atoms in the ring have not hitherto been described. Ether lactones having rings of six and seven atoms have been prepared by self-esterification of the corresponding hydroxy acids or derivatives thereof. Thus Hollo (Ber. 61, 895 (1928)) prepared beta-hydroxy-ethoxyacetic acid and its six-membered ether lactone by the following series of reactions:

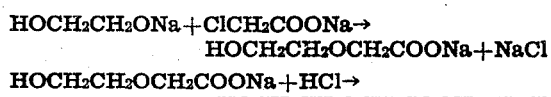

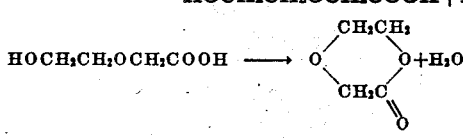

In a similar manner Palomaa and Toukola (Ber. 66, 1629 (1933)) prepared the seven-membered ether lactone

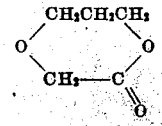

using chloroacetic acid and the sodium derivatives of trimethylene glycol as intermediates. In addition to the cyclic lactone the latter investigators obtained a polymer of the hydroxy ether acid as a by-product. This polymer would be a linear condensation polyester whose recurring units have seven atoms in the chain, as indicated below:

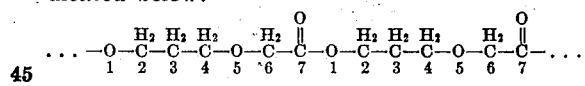

Lactones of more than seven members cannot be prepared by the process just described since the higher hydroxy acids yield exclusively polymer on heating.

It is known that certain large membered cyclic compounds, such as cyclic ketones and esters, have highly characteristic odors which make them useful as perfume ingredients. For example, the active principle of musk and civet are cyclic ketones of 15 and 17 members. Cyclic esters, particularly those having rings of from 15 to 18 members, also have musk-like odors which make them of value as substitutes for the active principle of musk and civet. Cyclic esters of the lactone type are especially useful for this purpose, but owing to the difficulty with which the intermediate hydroxy acids are obtained, the cyclic lactones are very costly.

It has now been found that large membered cyclic lactones derived from hydroxy acids having an ether linkage also have pleasant odors which make them valuable as perfume ingredients. Moreover, a method has been found whereby these ether lactones can be prepared from relatively cheap ingredients. These products and their method of preparation form the basis of the present invention.

An object of this invention is to prepare new and valuable compositions of matter. Another object is to prepare self esters of monocarboxylic hydroxyether acids, which acids have at least six atoms in the chain between the hydroxyl group and the carboxyl carbon atom. Another object is to prepare ether lactones containing at least eight members in the ring. A further object is to depolymerize polyesters derived from hydroxy acids containing an ether linkage. Still another object is to prepare new and useful odoriferous compounds. Other objects will appear hereinafter.

These objects are accomplished by heating a hydroxyether acid having a unit length of at least eight until a linear polyester is formed, and heating the linear polyester thus produced at a temperature sufficiently high to cause depolymerization but below the temperature of destructive thermal decomposition or carbonization, under conditions which permit the removal of the volatile products which are formed.

The preferred procedure embodies the use in the depolymerization of an inorganic catalyst selected from the class consisting of the chlorides, nitrates, carbonates, and oxides of the following divalent metals: manganese, magnesium, cadmium, iron, cobalt, tin, and lead, under diminished pressure and at a temperature of 225–300° C. in an apparatus designed for the removal of the volatile depolymerization products.

In the present invention, the large ring ether lactones are prepared by the depolymerization of the linear polyesters derived from hydroxy acids containing one or more ether linkages. The process used in the depolymerization of the polyesters to cyclic products is similar to that described in Hill and Carothers, J. Am. Chem. Soc. 54, 5031 (1933), in Carothers and Hill, U. S. Patent No. 2,020,298, and in my copending application, Serial No. 10,637, filed March 12, 1935. Although the patent application and the patent disclose the preparation of large ring lactones by the depolymerization of polyesters derived from hydroxy acids, the hydroxy acids mentioned do not have an ether linkage and consequently the lactones do not contain an ether linkage.

Before describing the invention in detail, it will be convenient to indicate what is meant by certain terminology used herein. The expression "ether lactone" refers to a lactone derived from an aliphatic hydroxy acid containing an ether linkage. The present invention is concerned with ether lactones derived from aliphatic hydroxy acids containing one or more ether linkages and having a "unit length" of at least eight. The term "unit length" refers to the number of atoms in the chain of the hydroxy acid, exclusive of the hydroxyl of the carboxyl group, the hydrogen on the alcoholic hydroxyl group and any atoms in the chain which are not between the hydroxyl and carboxyl groups. For example, the unit length of the hydroxyether acid listed below is eight.

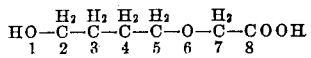

The unit length of the ether hydroxy acid is equivalent to the chain length of the recurring structural unit of the polyester derived therefrom and to the number of atoms in the ring of the monomeric cyclic ether lactone derived from the polyester by depolymerization. The term "macrocyclic compound" refers to a compound containing more than seven atoms, i. e. at least eight, in the ring. Other terms used herein such as "linear polyester", "depolymerization", etc., have been described in the literature and in Carothers and Hill U. S. Patent 2,020,298.

The present invention, therefore, is concerned with macrocyclic ether lactones. These lactones may be represented by the following general formula:

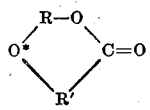

in which R represents a divalent organic radical and R' a divalent hydrocarbon radical and in which the sum of the chain lengths of R and R' exceeds four, i. e. their sum is at least five. The ether oxygen is marked with an asterisk. It is to be distinguished from the lactone or ester oxygen which is united to a carbonyl (CO) group.

The first step in the synthesis of macrocyclic ether lactones is the preparation of the intermediate hydroxy acid containing an ether linkage. This is accomplished by reacting a monoalkali derivative of a glycol with a monohalogen substituted monocarboxylic acid and treating the product thus formed with acid to liberate the free hydroxy acid. The reagents, that is, the glycol and the halogen substituted monocarboxylic acid, are selected so that the unit length of the resultant hydroxy ether acid will be greater than seven. General equations for the preparation of the hydroxy ether acids are illustrated below:

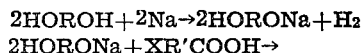
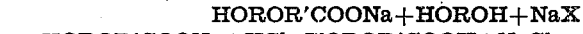

In these equations R represents a divalent organic radical, R' a divalent hydrocarbon radical, and X halogen; the sum of the chain lengths of R and R' exceeds four. For example, if chloroacetic acid is used, in which case R' has a chain length of one methylene, a glycol must be selected in which R has a chain length of at least four; in other words, the lowest glycol that can be used is a 1,4-glycol such as tetramethylene glycol. The hydroxy acid formed from chloroacetic acid and tetramethylene glycol, $$HOCH_2CH_2CH_2CH_2OCH_2COOH,$$

has a unit length of eight.

The second step in the preparation of the macrocyclic ether lactone is the polymerization of the hydroxy ether acid. This is accomplished by heating the hydroxy acid to a sufficiently high temperature, generally around 200° C., with or without a catalyst, until self-esterification takes place. The esterification takes place intermolecularly as indicated in the following equation, to give a linear polyester. In this equation, X represents the number of reacting molecules of hydroxyacid:

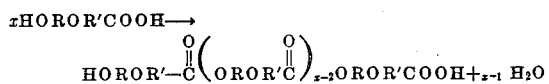

The chain length of the recurring structural unit —OROR'C— of the linear polyester thus formed is thus equivalent to the unit length of the hydroxy acid. The present invention is not limited to the use of polyesters prepared by the above method: For example the polyester may be prepared from an esterifying derivative of the hydroxyether acid such as an alkali metal salt of the appropriate halogen acid or a volatile monohydric alcohol or phenolester of the hydroxy acid or halogen acid. In general, the polyesters regardless of source are waxy or resinous solids having various degrees of hardness.

The final step in the synthesis of the macrocyclic ether lactones is the depolymerization of the linear polyesters. The polyesters may be used directly without purification; in fact, it is convenient to depolymerize the polyester in the same vessel in which it is prepared. The polyester is heated under reduced pressure, generally below 20 mm. and preferably below 1 mm., at a temperature sufficiently high to cause depolymerization but not high enough to cause destructive decomposition, generally 150-375° C. and preferably 225-300° C., in an apparatus designed so that the volatile depolymerization products, that is, the macrocyclic lactones, can be removed as they are formed. A suitable apparatus for this purpose is that described in copending application, Serial No. 10,637. A molecular still may also be used. Although the depolymerization takes place slowly in the absence of a catalyst, it is desirable to use a catalyst. Suitable catalysts are the alkali metals mentioned in Carothers and Hill U. S. Patent No. 2,020,298, but the preferred catalysts are those mentioned in my copending application, i. e., the chlorides, nitrates, carbonates, and oxides of magnesium, manganese, cadmium, iron cobalt, tin, and lead, in their divalent state. Certain metals, for example, magnesium may also be used. The catalyst may be admixed with the polyester prior to depolymerization or may be incorporated in the polyester during its preparation.

The chief product of the depolymerization of linear polyesters derived from hydroxy ether acids is the corresponding cyclic monomer but some dimer is also formed. The relative amounts of monomer and dimer produced is dependent, among other things, upon experimental conditions and the chain length of the recurring structural unit in polyester. Generally, the yield of monomer is greatest when a highly efficient catalyst is used.

For the most part, the macrocyclic ether lactones are liquid or low melting solids. Their structure is established by analysis, molecular weight determination, physical properties, etc. The method of formation is also indicative of the structure. The ether lactones herein described have much in common with the large ring ketones, anhydrides, and carbonates described in the literature. Many of the ether lactones have odors which make them of value as perfume ingredients. Perhaps the most useful compounds for this purpose are those having rings of 15, 16 and 17 members. These lactones therefore represent a further preferred embodiment of the invention.

Specific directions for the preparation of typical macrocyclic lactones by the method of this invention are given in the following examples wherein "parts" indicates "party by weight". The examples are illustrative only and not limitative.

*Example 1*

Twenty-three parts of sodium was dissolved in 248 parts of ethylene glycol. The resultant mixture was heated to 110–115° C. with stirring and 133 parts of omega-bromoundecanoic acid was added in one quarter portions during one hour. Stirring and heating were continued for four hours and then as much ethylene glycol as possible was removed by reducing the pressure. The residue was dissolved in water, acidified with hydrochloric acid, and extracted with ether. The hydroxy ether acid, $HO(CH_2)_2O(CH_2)_{10}COOH$, was obtained as a brown solid by evaporating the ether from the ether extract. On recrystallization from petroleum ether, the hydroxy ether acid was obtained as a white powder melting at 48–50° C. and having a neutral equivalent of 244 as compared with a theoretical value of 246. The crude acid was polymerized by heating at 200° C. for two hours, the liberated water being allowed to distill. Ninety-five parts of linear polyester was obtained in this way. Seventy-five parts of the crude polymer and 3.5 parts of hydrated magnesium chloride ($MgCl_2.6H_2O$) were heated together in a vapor heated still to 270° C. under less than 1 mm. pressure for four hours. The distillate consisted of approximately 44 parts of the cyclic monomer and three parts of the cyclic dimer. The monomer is an ether lactone having 15 members in the ring with the following properties: B. P. 108–111° C./1 mm.; M. P. 7–8° C.;

$n_D^{23}$ 1.4645; $d_4^{23}$ 0.9916

$M_R$ calcd. 63.39; $M_R$ found 63.52. Analysis: calcd. for $C_{13}H_{24}O_3$: C, 68.42%; H, 10.52%; mol. wt., 228. Found: C, 68.57%; H, 10.17%; mol. wt. 232. The cyclic monomer had a pleasant musk-like odor. The dimer melted at 106–107° C. Analysis: calcd. for $C_{26}H_{48}O_6$: C, 68.42%; H, 10.52%; mol. wt. 456. Found: C, 68.16%; H, 10.36%; mol. wt., 466. The structure of the monomeric and dimeric ether lactones is given below:

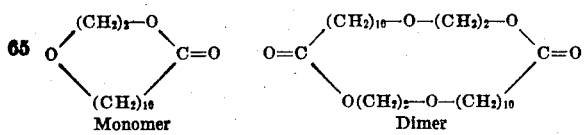

Monomer  Dimer

*Example 2*

Following the general method described in Example 1, the hydroxy ether acid, $HO(CH_2)_3O(CH_2)_{10}COOH$

was prepared from trimethylene glycol and omega-bromoundecanoic acid. This hydroxy acid is a white powder melting at 50–51° C. It was found to have a neutral equivalent of 263 as compared with a theoretical value of 260. When the crude hydroxy acid was heated to 200° C. for two hours, it formed a brown pasty linear polymer. A mixture of 40 parts of this linear polyester and one part of magnesium chloride was heated in a vapor heated still at 270° C. under about 1 mm. pressure for four hours. The depolymerizate obtained as a distillate contained 27 parts of crude cyclic monomer which, on redistillation, boiled at 119–120° C./2 mm. This 16-membered ether lactone had a pleasant musk-like odor. Other properties are: M. P. 12° C.;

$n_D^{23}$ 1.4622; $d_4^{23}$ 0.9762

$M_R$ calcd. 67.99; $M_R$ found 68.13. Analysis: calcd. for $C_{14}H_{26}O_3$: C, 69.42%; H, 10.74%; mol. wt. 242. Found: C, 69.76%; H, 11.00%; mol. wt. 234.

*Example 3*

Twenty-three parts of sodium was reacted with 270 parts of tetramethylene glycol with stirring. The solution was heated to 140° C. and 124 parts of omega-bromoundecanoic acid was added portion-wise during one hour. After heating for two hours, the mixture was dissolved in water and acidified with hydrochloric acid. The ether hydroxy acid, $HO(CH_2)_4O(CH_2)_{10}COOH$ which separated as a brown oil was extracted with ether. Petroleum ether was then added to the dry ether solution and on cooling 81 parts of the hydroxy ether acid separated as a powder which melted at 52–53° C. after recrystallization. Polymerization of the hydroxy acid in the usual manner gave a brown pasty polyester. A mixture of 60 parts of this polymer and five parts of magnesium chloride was heated to 270° at 1 mm. for about three hours. Thirty-three parts of pale yellow liquid was obtained. On purification, 25 parts of monomer boiling at 129–131° C./1 mm. was obtained. The product has a musk-like odor. Other physical properties of this monomeric 17-membered ether lactone are: M. P. 19° C.;

$d_4^{23}$ 0.9724; $n_D^{23}$ 1.4646

$M_R$ calcd. 72.60; $M_R$ found 72.68. Analysis; calcd. for $C_{15}H_{28}O_3$: C, 70.31%; H, 10.93%; mol. wt. 256. Found: C, 70.31%; H, 11.01%; mol. wt. 258.

The present invention is not limited to the particular macrocyclic ether lactones described in the preceding examples. A very wide variety of monomeric and dimeric ether lactones having the general formulas

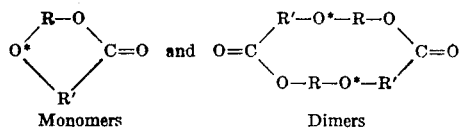

Monomers  Dimers in which R and R' have the meanings previously given, may be prepared by the methods of this invention by varying the glycol and the monohalogen substituted monocarboxylic acid used in the preparation of the ether hydroxy acid, i. e., by varying the R and R' in the above formulas. Other acids which may be used in addition to chloroacetic and omega-bromoundecanoic acid already cited are: alpha-bromopropionic acid, beta-chloropropionic acid, omega-bromobutyric acid, omega-chloropentanoic acid, omega-gromohexanoic acid, omega-bromoheptanoic acid, etc. In addition to the glycols already cited, the following glycols may also be used in the preparation of the ether hydroxy acids: pentamethylene glycol, hexamethylene glycol, nonomethylene glycol, decamethylene glycol, tetradecamethylene glycol, octadecamethylene glycol, beta, beta-dimethyltrimethylene glycol, alpha-methyl pentamethylene glycol, propylene glycol, diethylene glycol, triethylene glycol, etc. It will be noted that R' represents a divalent hydrocarbon radical which may be a straight chain or a branched chain. On the other hand, R represents a divalent organic radical which need not necessarily be a strictly hydrocarbon radical. This is illustrated by the ether lactones derived from the hydroxy acid, $$HOCH_2CH_2OCH_2CH_2OCH_2CH_2COOH$$

prepared from diethylene glycol and beta-chloropropionic acid. The structural formula of the monomeric ether lactone prepared from this hydroxy acid by polymerization followed by depolymerization is shown below:

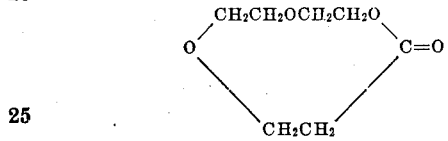

It will be noted that this lactone contains two ether linkages.

In the examples, magnesium chloride is the catalyst used. Among other substances which accelerate the depolymerization of the polyesters may be mentioned basic materials, such as alkali metals, hydroxides, carbonates, and alcoholates; certain inorganic salts, such as stannous chloride, manganese chloride, ferrous chloride, cobaltous chloride, cobaltous nitrate, manganese carbonate, magnesium oxide, magnesium carbonate; and certain metals, notably magnesium. The optimum conditions of temperature and catalyst for the depolymerization of each polyester must be determined experimentally. The temperature-range which has been found to be most useful is that ranging from 225 to 300° C. Magnesium chloride has proved to be a catalyst of wide utility.

The depolymerization of polyesters derived from ether hydroxy acids has been disclosed as a method for making macrocyclic ether lactones. However, this case is not limited to ether lactones prepared by this method. Other methods may also be used to prepare these new macrocyclic compounds. For example, the macrocyclic ether lactone can be prepared directly from the hydroxy ether acid by applying the principle of high dilution described in a copending application of Carothers and Hill, Serial No. 701,980, filed December 12, 1933. In applying this method to the synthesis of the cyclic ether lactones, the hydroxy ether acid is heated to esterification temperature in extremely dilute solution, usually in the range of 1/100 to 1/5000 molar. In general, this method is less convenient than the depolymerization method described in the examples.

This invention provides a convenient and efficient method for the preparation of large-membered ether lactones. In general, the ether lactones can be prepared more cheaply than ordinary lactones, because the intermediate hydroxy ether acid can be synthesized from more readily available compounds than the long chain hydroxy monocarboxylic acids used in the preparation of the ordinary lactones, i. e., lactones containing no ether linkages. The characteristic fragrances of the monomeric large-membered ether lactones make them useful either alone or in combination with other substances in the compounding of perfumes, toilet waters, cosmetics, soaps, incense, and the like. The close resemblance of the odors of the monomeric ether lactones of 15 to 18 members to that of natural musk and their fixative power makes them valuable as substitutes for this material. In general the addition of as little as 0.01 per cent of the cyclic ether lactone is sufficient to improve the odor of perfume compositions as is shown by the following example:

*Example 4*

Addition of one part of macrocyclic ether lactone, e. g. the monomeric lactones of $\omega$-($\beta$-hydroxyethoxy) undecanoic acid, $\omega$-($\gamma$-hydroxypropoxy) undecanoic acid and $\omega$-($\delta$-hydroxybutoxy) undecanoic acid to ten thousand parts of the following perfumes resulted in products having improved odors over similar compositions containing no cyclic ether lactone.

A. An ambre perfume comprising labdanum, bergamot, and rose.

B. A jasmin perfume comprising benzyl acetate, linalool, linolyl acetate, and hydroxycitronolellal.

C. A rose perfume comprising geraniol, citronellal, and phenylethyl alcohol.

The ether lactone acts as a powerful fixative in these compositions and in this respect resembles natural musk (muscone) or the lactone from angelica oil.

The above description and examples are intended to be illustrative only. Any modification of or variation therefrom which conforms to the spirit of the invention is intended to be included within the scope of the claims.

I claim:

1. Process for the preparation of a lactone of a saturated aliphatic hydroxyether acid having a unit length of at least eight which comprises heating under vacuum a linear polyester of said acid.

2. Process for the preparation of a lactone of a saturated aliphatic hydroxyether acid having a unit length of at least eight which comprises heating a linear polyester of said acid under vacuum at a temperature such that depolymerization takes place but below that at which destructive decomposition occurs and removing the volatile products.

3. Process for the preparation of a lactone of a saturated aliphatic hydroxyether acid having a unit length of at least eight which comprises heating a linear polyester of said aciid under vacuum at 225-300° C. and removing the volatile products.

4. Process of claim 1 wherein the depolymerization is conducted in the presence of a magnesium catalyst.

5. Process of claim 3 wherein the depolymerization is conducted in the presence of a magnesium catalyst.

6. Process of claim 1 wherein the depolymerization is conducted in the presence of manganous chloride as a catalyst.

7. Process of claim 3 wherein the depolymerization is conducted in the presence of manganous chloride as a catalyst.

8. Process of claim 1 wherein the depolymerization is conducted in the presence of stannous chloride as a catalyst.

9. Process of claim 3 wherein the depolymerization is conducted in the presence of stannous chloride as a catalyst.

10. Process of claim 1 wherein a catalyst for the depolymerization is used.

11. Process of claim 1 wherein magnesium chloride is used as a catalyst for the depolymerization.

12. Process of claim 3 wherein a catalyst for the depolymerization is used.

13. Process of claim 3 wherein magnesium chloride is used as a catalyst for the depolymerization.

14. Process for the preparation of a cyclic ester which comprises heating the linear polyester of ω-(β-hydroxyethoxy)undecanoic acid at 270° C. and a pressure of less than one millimeter in the presence of magnesium chloride and removing the volatile products.

15. Process for the preparation of a lactone of a saturated aliphatic hydroxyether acid having a unit length of at least eight which comprises heating a linear polyester of said acid at a pressure below 20 mm. at 225–300° C. and removing the volatile products.

16. An ether lactone of a saturated aliphatic hydroxyether acid, said acid having a unit length of fifteen to seventeen.

17. Saturated aliphatic ether lactones having at least eight annular atoms and having but one ether linkage in the lactone ring.

18. A process wherein a saturated aliphatic omega hydroxyether acid having a unit length of at least eight is polymerized to a linear polyester by heating at atmospheric pressure and said linear polyester is depolymerized by heating under vacuum to an ether lactone.

19. Process for the preparation of lactones which comprises heating a linear polyester of an acid of the formula HO—R—O—R'—COOH wherein R and R' are divalent saturated aliphatic hydrocarbon radicals and the sum of the chain lengths of R and R' is at least five, under vacuum at a temperature of 225–300° C., and removing the volatile products.

20. A monomeric ether lactone of the formula

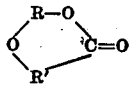

wherein R and R' are divalent saturated aliphatic hydrocarbon radicals and the sum of the chain lengths of R and R' is at least five.

21. A monomeric ether lactone of the formula

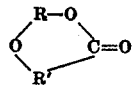

wherein R is a divalent saturated aliphatic hydrocarbon radical derived from a dihydric alcohol by removing the hydroxyl groups thereof, R' is a divalent saturated aliphatic hydrocarbon radical and the sum of the chain lengths of R and R' is from 12 to 14.

22. A dimeric ether lactone of the formula

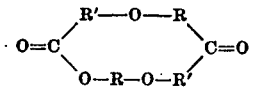

wherein R is a divalent saturated aliphatic hydrocarbon radical derived from a dihydric alcohol by removing the hydroxyl groups thereof, R' is a divalent saturated aliphatic hydrocarbon radical and the sum of the chain lengths of R and R' is at least five.

23. A self-ester of a saturated aliphatic hydroxymonoether acid, said acid having a unit length of at least eight.

24. A linear polyester of a saturated aliphatic hydroxyether acid, said acid having a unit length of at least eight.

25. Saturated aliphatic monoether lactones having at least eight members in the ring.

26. A lactone of the following formula:

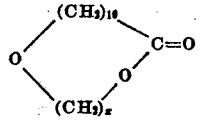

wherein X is a whole number from 2 to 4.

27. Saturated aliphatic ether lactones having fifteen to seventeen members in the ring.

28. A lactone of the following formula:

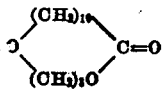

29. A saturated aliphatic ether lactone having at least thirteen members in the ring and but one ether linkage.

EDGAR W. SPANAGEL.

Certificate of Correction

Patent No. 2,163,109. June 20, 1939.

EDGAR W. SPANAGEL

It is hereby certified that errors appear in the printed specification of the above numbered patent requiring correction as follows: Page 1, first column, line 24, for that portion of the formula reading

page 3, first column, line 17, for "party" read *parts;* and second column, line 71, for "omega-gromo-" read *omega-bromo-;* and that the said Letters Patent should be read with these corrections therein that the same may conform to the record of the case in the Patent Office.

Signed and sealed this 12th day of September, A. D. 1939.

[SEAL]

HENRY VAN ARSDALE,
*Acting Commissioner of Patents,*